March 19, 1929.   F. DREXLER   1,706,201
GYROSCOPIC DEVICE
Filed June 12, 1919   3 Sheets-Sheet 1

WITNESSES

INVENTOR
FRANZ DREXLER
BY
ATTORNEYS

March 19, 1929.  F. DREXLER  1,706,201
GYROSCOPIC DEVICE
Filed June 12, 1919   3 Sheets-Sheet 2
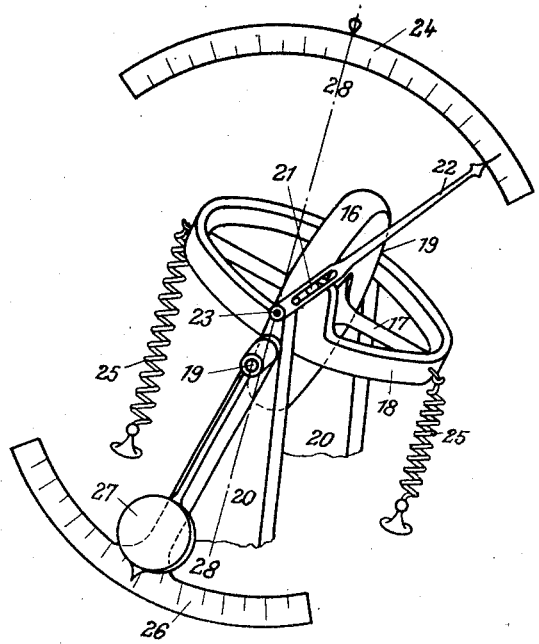
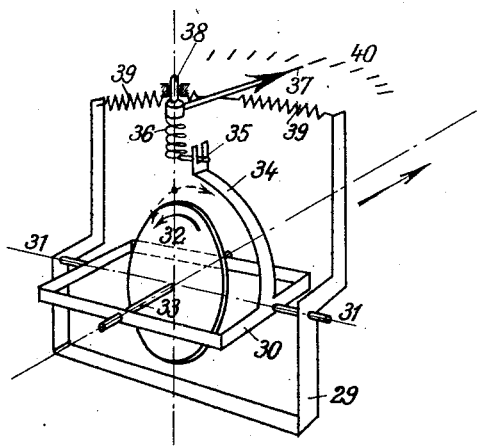
WITNESSES
INVENTOR
FRANZ DREXLER
BY
ATTORNEYS March 19, 1929.                F. DREXLER                1,706,201
                           GYROSCOPIC DEVICE
                          Filed June 12, 1919            3 Sheets-Sheet 3

WITNESS

G. V. Rasmussen

INVENTOR
FRANZ DREXLER
BY
ATTORNEYS

Patented Mar. 19, 1929.

1,706,201

UNITED STATES PATENT OFFICE.

FRANZ DREXLER, OF BERLIN-FRIEDENAU, GERMANY, ASSIGNOR, BY MESNE ASSIGNMENTS, TO PIONEER INSTRUMENT COMPANY, INCORPORATED, OF BROOKLYN, NEW YORK, A CORPORATION OF NEW YORK.

GYROSCOPIC DEVICE.

Application filed June 12, 1919, Serial No. 303,808, and in Germany October 17, 1917.

(GRANTED UNDER THE PROVISIONS OF THE ACT OF MARCH 3, 1921, 41 STAT. L., 1313.)

The object of this invention is to provide a gyroscopic device for indicating the horizontal turn of a movable dirigible object. The present gyroscopic device is mainly intended for vehicles, especially aeroplanes, for indicating the direction and rate of turn of the same around a normally vertical axis.

According to this invention the horizontal turn to be measured is transferred to a support on which a gyroscope is so mounted that the gyroscope axle may swing in a plane of said support parallel to the normally vertical axis thereof. Resilient means, tending to keep the gyroscope axle in a definite angular, preferably rectangular, position relative to said support axis, are operatively associated with the gyroscope axle and with the support. When the dirigible object makes a horizontal turn, the aforementioned plane in which the gyroscope axle may swing, is turned correspondingly. According to the well-known law of physics of the gyroscope, the gyroscope reacts upon the angular displacement of its axis by tending to swing within the plane mentioned. This tendency is counteracted by the resilient means so that the gyroscope axle is deflected to a certain extent dependent upon the rate of the turn. The direction of the deflection, which is indicated by suitable means, shows the direction of turn.

Another object of the invention is a turn indicator for a dirigible object which is adapted to make turns in a vertical plane and to be subjected to forces tending to impart to the same swinging oscillations in said plane as well as swinging oscillations in a plane rectangular to the direction of travel.

A further object of the invention is a gyroscopic device for aeroplanes, which indicates the correct degree of banking, i. e. the lateral inclination in turns, and which is particularly adapted for that type of aeroplane which requires a degree of banking which cannot be determined by the usual pendulum device or clinometer.

If the dirigible object, the turn of which is to be measured is adapted to make turns within a vertical plane, it will be especially advantageous, if the plane of rotation of the gyroscope coincides with said vertical plane.

In the accompanying drawings I have represented several examples of apparatus embodying my invention.

Fig. 3 is a perspective view of a gyroscopic device equipped with a pendulum, and adapted to indicate the required degree of banking.

Fig. 4 shows in perspective a further form of gyroscopic device constructed according to my invention, in which the vehicle is assumed to be traveling forward. This form has no pendulum but has a special kind of resilient restraining or limiting device restricting or checking the swing about one of the axes of the apparatus.

There is a special demand in the case of vehicles of the above-mentioned kind for measuring the horizontal turn of the vehicle, that is to say, the horizontal deviation of the vehicle from the straight course. With many vehicles, especially aeroplanes or aircraft in general, it is further important to provide means enabling the operator controlling the aeroplane, to counteract forces tending to impart to the aeroplane swinging oscillations transverse to the direction of travel. Such oscillations are liable to disturb the function of the turn indicator.

Figure 1:
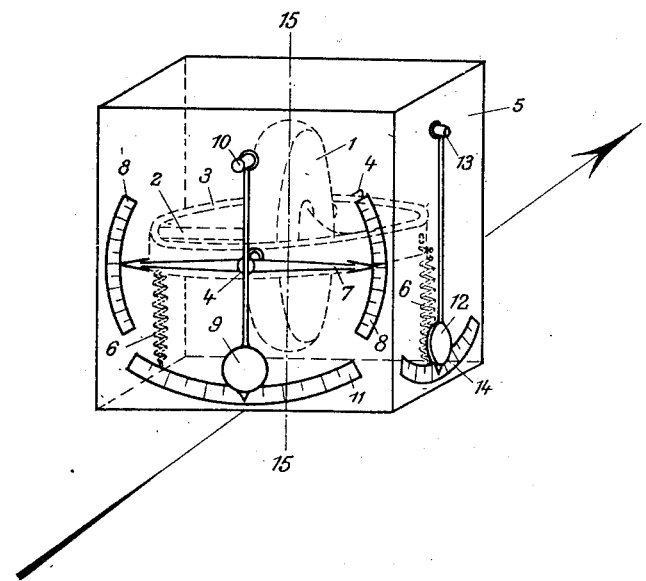
Fig. 1 is a perspective view of a gyroscopic device, equipped with two pendulums and suitable for use with vehicles, especially aeroplanes, it being assumed that the vehicle or craft is traveling forward in a straight line.

Fig. 1 shows a form of the gyroscopic device which is particularly adapted for aeroplanes. A spinning top or gyroscope 1 having an axle 2 is mounted in a box-shaped support 5 in such a manner that the axle 2 may swing in a plane parallel to the axis 15—15 of said support. This axis has a vertical position under normal conditions, that is to say, during travel in a straight horizontal line. Preferably, the axle 2 is rotatably mounted within a ring or frame 3, which swings around an axis 4—4 within the box-shaped support 5. The axis 4—4 is angularly, preferably rectangularly disposed with respect to the axis 15—15 of the support. Two springs 6—6 serve for connecting the frame 3 resiliently with the bottom of the support 5, thereby forming resilient means tending to keep the axle 2 in a definite angular, preferably rectangular, position, to the axis 15—15. The support is fixed upon the dirigible object or vehicle. The axle 4 of the ring shaped frame 3 carries a pointer 7, whose position may be read off at two scales 8—8 fixed to the support. In that way the pointer 7 indicates in which direction and at which rate the axle 2 is deflected from its normal position. A pendulum 9 is mounted upon the front of the box 5 so as to swing around the axle 10 transversely to the direction of travel, and in front of the scale 11. As the front of the box 5 forms a dial which carries the scales or indicating marks 8—8 cooperating with the pointer or indicator 7, and the scale 11 cooperating with the pendulum 9, the indicator 7 and the pendulum 9 are thus coordinated with the same dial and are in the same field of view to be observed simultaneously. Another pendulum 12 is mounted on the sidewall of the box 5 and swings perpendicularly to the former pendulum around the axle 13 and in front of the scale 14.

Figure 2:
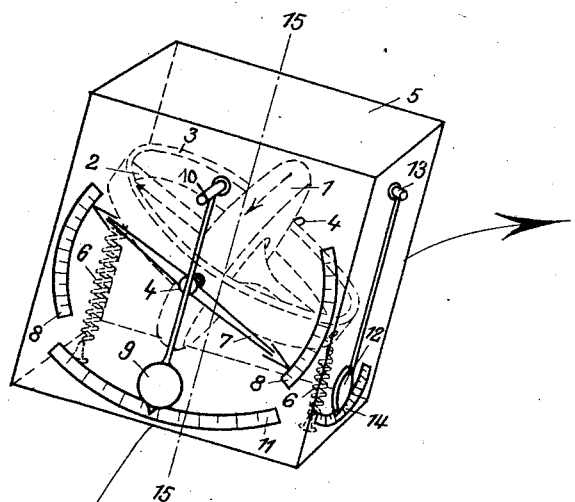
Fig. 2 shows in perspective the same device as Fig. 1, during a horizontal turn or "banking" of the vehicle.

The operation of the device is as follows:

When the aeroplane changes its course so as to make a horizontal turn, as shown by the arrow in Fig. 2, the axle 2 is correspondingly turned, when seen in plan view, and the gyroscope reacts upon such a turn by a precession movement tending to swing, rectangularly to the plane of the turn, with a force which depends upon the rate of the turn. Therefore, the gyroscope deflects its frame 3 swinging the same about the pivots 4. As the resisting force of the springs 6 increases with the deflection of the frame, the gyroscope assumes a position, the inclination of which relative to the support 5 indicates the rate of turn and is shown by the pointer 7 on the scales 8.

It may be assumed that the aeroplane takes a straight horizontal course as represented by the arrow in Fig. 1. Consequently, the absolute direction of the axle 2 remains unchanged and the pointer 7 points to the centers of the scales 8. When now, under the influence of irregular wind currents, the one wing of the aeroplane is lifted and the other wing is depressed, and if the operator is prevented by fog or clouds from recognizing this tilting of the aeroplane with respect to the horizon, the one spring exerts a downward pull on the frame 3 while the other spring is relieved. Consequently, the springs tend to swing the axle 2. It is a well-known fact, that the gyroscope tends to resist such a displacement of its axle and to retain the absolute direction of the same, though it tends to swing rectangularly to the exerted pull if it is free to do so. Therefore, the pointer 7 retains its absolute direction for some time until the resistance of the gyroscope is overcome by the continuing action of the springs. Since the scales 8, however, are displaced corresponding to the assumed tilting of the aeroplane, the pointer 7 does not point any more to the centers of the scales but gives a positive indication, which is not due to any turn. After some time only, when the resistance of the gyroscope is overcome as above described, the pointer returns to its zero position. When the influence of the irregular wind current which caused the tilting, has ceased, the aeroplane, under normal conditions, assumes automatically again its normal position. Now, the gyroscope resists for some time a re-adjustment into its original horizontal position and, therefore, causes another deflection of the pointer 7 with respect to the scales 8.

From this consideration will be seen that swinging oscillations of the aeroplane in a plane transverse to its direction of travel, cause deflection of the pointer 7 which are not due to any horizontal turn and, consequently, result in a wrong indication.

Provision must be made, therefore, for enabling the operator of the aeroplane to counteract the described tiltings or oscillations whether or not he can see the horizon. In the represented embodiment, these provisions comprise the pendulum 9, which gives indication of the described swinging oscillation. The operator has to keep the aeroplane in a position in which the pendulum 9 assumes a definite position with respect to the scale 11. Then the pointer 7 gives a correct indication. The pendulum 9 and the pointer 7 are arranged in the same field of view to be simultaneously observed by the operator.

The pendulum 12 indicates on the scale 14 any inclination of the longitudinal axis of the aeroplane.

It is well known that during a horizontal turn an aeroplane has to be kept laterally inclined to a certain degree. This inclination, called "banking", is dependent on the rate of turn.

In some types of aeroplanes, the correct degree of banking may be obtained by keeping the aeroplane in a position in which a pendulum arranged thereon, e. g. the pendulum 9 in Figs. 1 and 2, assumes its normal central position, that is, the position which it assumes on the straight course.

In certain types of aeroplanes, however, the degree of banking must be smaller or greater by an amount which is dependent on the rate of turn, because the two wings have a different speed and, therefore, a different lifting force.

In Fig. 3 a gyroscopic device is shown, which indicates the degree of banking required for such types of aeroplanes. This device performs in addition the same function as the device shown in Figs. 1 and 2.

Figure 5:
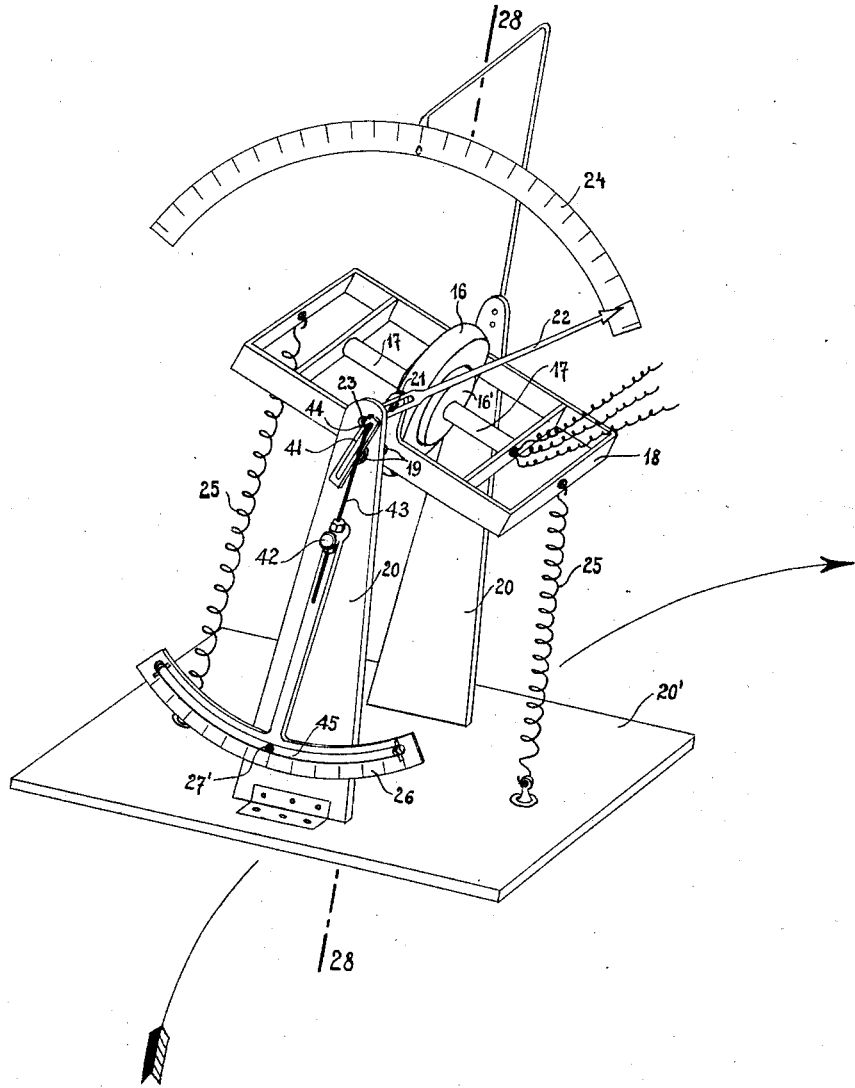
Fig. 5 illustrates another form of my invention.

A spinning top 16 having its axis at 17 rotates within a ring 18 which is mounted by means of two pivots 19—19 upon two supports 20—20. The top or gyroscope 16 may be rotated in any suitable manner, for instance by means of an electromotor indicated at 16' (Fig. 5). A pin 21 fixed on the ring 18 projects into a slot of a pointer 22 pivotally mounted upon the axle 23 and moving in front of a scale 24. Two springs 25—25 whose fixed points are arranged upon supporting frame 20' (Fig. 5) will limit or oppose the swinging of the ring 18 around the axle 19—19. A scale 26 is operatively connected to the frame or ring 18 so as to be displaced by the deflection of the ring. In the represented embodiment, the scale is rigidly mounted on the front pivot 19. Furthermore a pendulum 27 is suspended from this pivot so as to swing with respect to, and to point on, the scale 26.

If, due to a horizontal turn of the aeroplane, the gyroscopic device swings about the axis 28—28, the spinning top will exert a torque around the axis 19—19 which will be received by the springs 25—25, so that the top will undergo a deflection in the direction of the torque. This deflection is indicated by the pointer 22 on the scale 24 in any desired ratio of magnification. At the same time the scale 26 will be turned through a definite angle relatively to the vehicle, said angle being dependent upon the deflection of the frame 18 of the spinning top as shown in the particular arrangement represented in the drawing.

The operator has to impart to the aeroplane such a lateral inclination, that the pendulum 27 points always to the center of the scale 26. If the speed of rotation of the gyroscope, as well as the strength of the springs 25, is properly designed, with respect to the qualities of stability of the aeroplane, the correct degree of banking is always obtained in this way, whatever the rate of horizontal turn may be.

A special advantage of the embodiment shown in Figs. 1, 2 and 3 for the use in aeroplanes results from the fact that the gyroscope axle normally assumes a horizontal position which is transverse to the direction of travel. Due to this position the gyroscope remains substantially unaffected by turns of the aeroplane in a vertical plane and by oscillations in that plane which might be produced by irregular air current.

If such oscillations of a considerable extent and turns in a vertical plane are not in question, and if swinging oscillations in a plane rectangular to the direction of travel cannot be counteracted by the operator, as is the case with a ship, the gyroscopic turn indicator shown in Fig. 4 is especially well suited. In this construction the gyroscope axle is longitudinally positioned to the direction of travel.

A frame 30 is movably mounted within a support 29 upon pivots 31—31. A spinning top 32 is rotatably mounted upon the axle 33 within said frame 30. An arm 34 of the frame 30 co-operates with the lever 35 which actuates the pointer 37 through a resilient connecting link 36, said pointer being rotatably mounted in the fixed bearing 38. Two springs 39—39 attached with their outer ends to upwardly projecting arms of the support 29 and with their inner ends to the pointer 37, tend to keep the pointer 37 in the center of the scale 40.

Assuming that the vehicle, such as a ship be heavily rocking or oscillating about its longitudinal axis and in a smaller degree around its transverse axis, it is of fundamental importance to arrange the axis of the spinning top parallel to the axis of the largest oscillations, that is, in the direction of the travel. The reason for this is that all oscillations of the support 29, which take place around an axis parallel to that of the spinning top, do not exert the above explained disturbing influence upon the gyroscope, while movements around the axis 31—31 will disturb the latter. Through the resilient connecting link 36 vibrations of the vehicle, which could cause heavy swinging of the pointer 37, are rendered harmless. By this a more exact indication is attained because the inaccuracies which are inherent to the transmitting elements for the deflection of the gyroscope do not come into action.

The deflection of the gyroscopic device may be damped in a suitable manner. In Fig. 1, a rod 46 is hinged to the frame 3 and a rod 47 is hinged to the support 5. Both the rods are connected by a dash pot 45 of well-known construction. The dash pot permits a mutual reciprocating movement of the rods 46 and 47 and damps this movement.

Instead of the pendulums shown in the figures, any desired pendulum means or clinometers showing the apparent direction of gravity may be employed.

I claim:

1. A gyroscopic device for indicating the turning of a movable object about an axis, comprising a support fixed to said movable object, a frame rotatably arranged on said support by pivots, a scale rigidly mounted on one of said pivots to rotate with the frame, a pendulum freely movable on said pivot and having indicating means reading on said scale, a gyroscope rotatably arranged in said frame, the axes of said frame and gyroscope being at right-angles to one another, springs connecting said frame with said support to resist the movement of said frame, a pointer arranged on said support, there being a slot in said pointer, a pin arranged on the frame, said pin projecting into said slot, and a scale for reading off the movement of said pointer.

2. A gyroscopic device for indicating the correct degree of banking of aeroplanes of the type set forth in the specification, comprising a support fixed to the aeroplane, a frame rotatably mounted on said support, the axis of said frame being angularly disposed with respect to the normally vertical axis of said support, a gyroscope rotatably mounted on said frame, the axis of said gyroscope being at a right angle to said frame axis, resilient means operatively associated with said frame and with said support, and tending to influence the frame to keep the gyroscope axis in a definite angular position relative to said vertical support axis, a scale operatively connected to said frame so as to be displaced by the deflection thereof from the aforementioned definite position, and a pendulum device associated with said support and adapted to swing with respect to, and to point on said scale, so that the operator of the aeroplane may hold the same, during a turn, on such a bank in which a definite point of said scale coincides with the position of said pendulum device.

3. A gyroscopic device for indicating the horizontal turn of an aeroplane, comprising a support fixed to said aeroplane and provided with a dial, a gyroscope, a frame for mounting the same in said support for precession in a plane parallel to the normally vertical axis of said support, resilient means operatively associated with said frame and with said support, and tending to influence the frame to keep the gyroscope axis in a definite angular position relative to said support axis, and an indicator mounted to swing in front of said dial operatively connected with said frame to move in unison therewith, for indicating on said dial the precession of said gyroscope axis from the afore-mentioned definite position, whereby the direction and the rate of turn is indicated, and pendulum means swinging transversely to the direction of travel and arranged in the same field of view as said indicator to be observed by the driver operating the aeroplane simultaneously with said indicator.

4. A gyroscopic device as set forth in claim 3 in which the resilient means are formed by a spring tending, with a force which increases with the aforesaid precession of the gyroscope, to keep the same in said definite position.

5. A gyroscopic device for indicating the horizontal turn of an aeroplane, comprising a support fixed to said aeroplane, a gyroscope, a frame for mounting the same in said support for precession in a plane perpendicular to the direction of travel, resilient means operatively associated with said frame and with said support, and tending to influence said frame to keep the gyroscope axis in a definite position relative to said support, which position is normally horizontal, so that the said gyroscope axis tends to assume, a horizontal position transverse to the direction of travel and, therefore, remains substantially unaffected by vertical turns, and an indicator operatively connected to said frame to move in unison therewith, a dial with indicating marks fixed to said support in a plane adjacent to the plane of movement of said indicator for indicating the precession of said gyroscope from the afore-mentioned definite position, whereby the direction and the rate of turn is indicated, and pendulum means swinging transversely to the direction of travel and arranged in the same field of view as said indicator to be observed by the driver operating the aeroplane simultaneously with said indicator.

In testimony whereof I have hereunto set my signature.

FRANZ DREXLER.